Patented May 23, 1933

1,910,938

UNITED STATES PATENT OFFICE

ALFRED THAUSS, OF COLOGNE-DEUTZ, AND MAX HARDTMANN, OF WIESDORF NEAR COLOGNE, GERMANY, ASSIGNORS TO I. G. FARBENINDUSTRIE AKTIENGESELLSCHAFT, OF FRANKFORT-ON-THE-MAIN, GERMANY

INSECT PESTS PROOF ARTICLE AND A PROCESS OF PREPARING SAME

No Drawing. Application filed May 6, 1930, Serial No. 450,305, and in Germany May 10, 1929.

The present invention relates to agents rendering proof to insect pests materials liable to attack by insects and to the materials rendered proof to attack by insects therewith.

According to our invention materials liable to attack by moths and by like insect pests, for example wool, skins, hair, feathers and the like are rendered proof against attack by said insects by applying to or incorporating with said material a compound which may be represented by the general formula

wherein R stands for an aromatic nucleus of the benzene or naphthalene series and $R_1$ represents an aromatic nucleus of the benzene series one and only one of which nuclei contains a hydroxy group as substituent, wherein R or $R_1$ is substituted by a group inducing solubility in water, for example by a sulfonic acid or ω-sulfonic acid group and wherein the nuclei may be further substituted by alkyl and halogen.

The compounds coming into consideration for the purpose of our invention are obtainable by condensing a phenol or a suitable derivative thereof and a suitable aralkyl compound such as aralkyl alcohols, ethers, halogen acids, which aralkyl compounds are not substituted by a hydroxy group, but may bear other substituents in sulfuric acid solution, as is described for example in British Patent 320,056; or by condensing the two components by means of zinc chloride and subsequently sulfonating the condensation product.

As phenolic components suitable for the production of the condensation products there may be enumerated phenol, p-cresol, chlorphenols, hydroxydiphenyl-methanes, hydroxydiphenyl-ketones, naphthols and the like, as aralkyl compounds, benzyl alcohol, esters and ethers thereof, benzyl-ω-sulfonic acid, and xylene chloride of the formula:

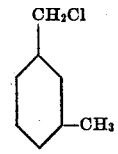

The incorporating or combining of these compounds with the materials to be protected may be performed in different ways.

The protective agent can be applied to the fiber to be protected advantageously by spraying an aqueous solution either of a water soluble salt of the agent, or if possible of the agent in its free form, for example, with a syringe or by brushing on or also by dipping and subsequent wringing out or centrifuging, after which the fiber can be rinsed with cold water, or otherwise the materials to be protected may be treated according to the methods of a dyeing process by treating the material in an aqueous solution of the condensation product for a prolonged time and preferably with the application of heat whereby the addition of organic or inorganic salts or acids or the addition of a wetting agent may be of advantage. In this case it is possible to combine with the impregnation process a dyeing process by the addition of suitable dyestuffs capable of being fixed upon the material together with the protecting agent by a dyeing process. Other customary methods of application will readily suggest themselves to those skilled in the art.

The protective agents specified do not damage the fiber to be protected, either in appearance, touch or behaviour when exposed to light.

The following examples illustrate our invention, without limiting it thereto:—

*Example 1.*—A woolen fabric to be treated is saturated with a solution containing per liter 1-2 grams of the condensation product obtainable in accordance with the process of the British specification No. 320,056 from 2-sulfo-4-chlorophenol and tetrachlorobenzyl-chloride (prepared by chlorinating benzyl chloride with the calculated amount of chlorine; positions of the chlorine atoms unknown) by reaction in sulfuric acid solution. The protective agent is allowed to act on the fabric for some time, after which the impregnated fabric is rinsed for a short time with cold water. The fabric is moth proof.

*Example 2.*—A woolen fabric to be treated is saturated with a solution containing per liter 1-2 grams of the condensation product obtainable from p-chloro-phenol and tetrachlorobenzyl-chloride with the addition of zinc chloride as condensing agent and subsequent sulfonation. The solution is allowed to act on the fabric at room temperature or with gentle heating. Then the fabric is rinsed with water after a short soaping and dried; by this treatment the fabric is rendered moth proof.

*Example 3.*—A woolen fabric is treated as described in Example 1 with the sulfonated condensation product from 2.4-dichlorophenol and 2.6-dichlorobenzyl chloride in such a manner that after drying there remains 3% on the fabric, which by this treatment is rendered moth proof.

*Example 4.*—A woolen fabric is treated as described in Example 1 using the sulfonated condensation product from β-naphthol and dichlorobenzyl-ω-sulfonic acid. This condensation product is obtained by adding chlorosulfonic acid drop by drop to a mixture of β-naphthol with double the molecular quantity of dichlorobenzyl-ω-sulfonic acid or dichlorobenzylalcohol in concentrated sulfuric acid.

*Example 5.*—β-naphthol is condensed with triple the molecular quantity of trichlorobenzylchloride or with another ester or ether of trichlorobenzylalcohol in concentrated sulfuric acid with the addition of chlorosulfonic acid. The naphthol takes up more than one molecular proportion of the trichlorobenzyl compound and is sulfonated simultaneously. A woolen fabric is rendered permanently moth proof by applying thereto 2% of this compound.

We claim:—

1. As an agent for rendering proof against attack by insects materials liable to attack by insects a compound of the general formula

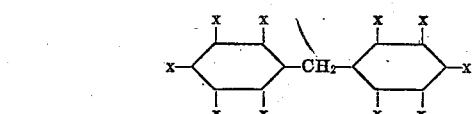

wherein one $x$ stands for a hydroxy group, a second $x$ stands for a sulfonic acid group and the remaining $x$'s stand for hydrogen, alkyl or halogen.

2. As an agent for rendering proof against attack by insects materials liable to attack by insects a compound of the general formula

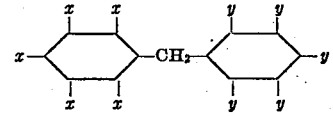

wherein one $x$ stands for a hydroxy group, a second $x$ stands for a sulfonic acid group, the remaining $x$'s stand for hydrogen, alkyl or halogen, 1 to 4 $y$'s stand for chlorine and the remaining $y$'s stand for hydrogen.

3. As an agent for rendering proof against attack by insects materials liable to attack by insects a compound of the general formula

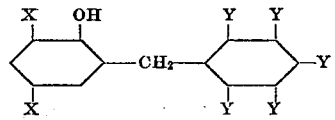

wherein one $x$ stands for a sulfonic acid group, the other $x$ stands for hydrogen, alkyl or chlorine, 1 to 4 $y$'s stand for chlorine and the remaining $y$'s stand for hydrogen.

4. As an agent for rendering proof against attack by insects materials liable to attack by insects a compound of the formula:

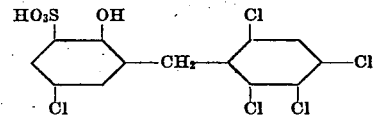

In testimony whereof, we affix our signatures.

ALFRED THAUSS.
MAX HARDTMANN.